P. H. PARSONS.
Hub-Mortising Machine Attachment.
No. 218,767.  Patented Aug. 19, 1879.
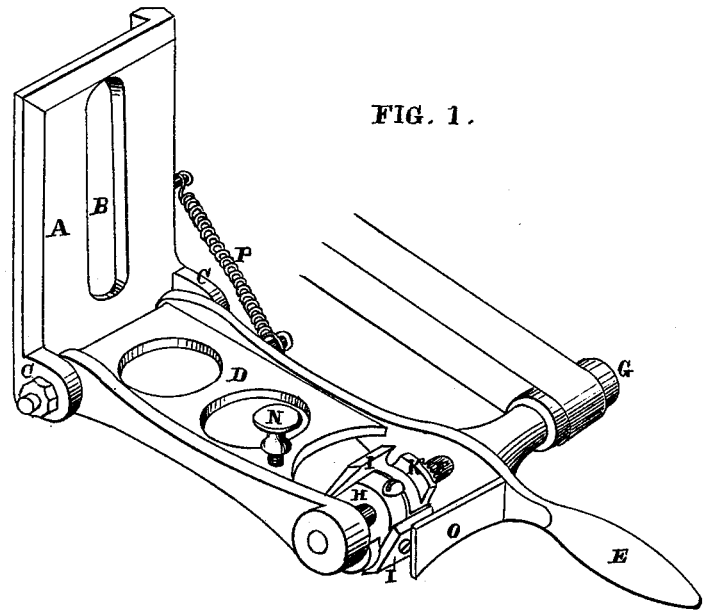
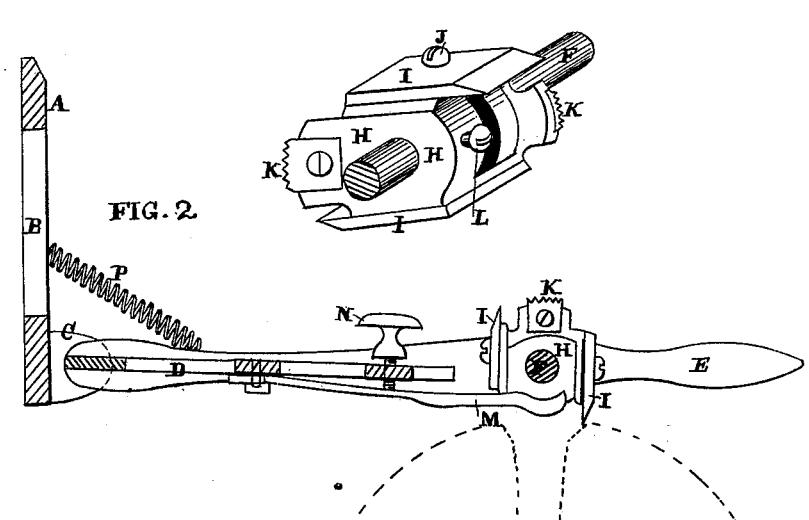
Witnesses
Geo. H. Strong.
Frank A. Brooks.
Inventor
Plummer H. Parsons
By Dewey & Co.
Attys

UNITED STATES PATENT OFFICE.

PLUMMER H. PARSONS, OF SACRAMENTO, ASSIGNOR OF ONE-HALF HIS RIGHT TO COLUMBUS WATERHOUSE, OF SAN FRANCISCO, CAL.

IMPROVEMENT IN HUB-MORTISING-MACHINE ATTACHMENTS.

Specification forming part of Letters Patent No. 218,767, dated August 19, 1879; application filed April 17, 1879.

*To all whom it may concern:*

Be it known that I, PLUMMER H. PARSONS, of the city and county of Sacramento, and State of California, have invented a Hub-Mortising-Machine Attachment; and I hereby declare the following to be a full, clear, and exact description thereof, reference being had to the accompanying drawings.

My invention relates to a novel attachment for or accompaniment to that class of machines which are used for forming the mortises in wheel-hubs into which the spokes are driven.

These mortises are formed by suitable cutters, while the hub is supported in a horizontal position upon an apparatus which is provided with a spacing-disk to suit the number of spokes which the wheel is to have. After these mortises have been cut, it is customary to bevel off the sides of each mortise with a chisel by hand, to receive the shoulders of each spoke. This consumes some time and is not accurate.

My invention consists in the employment of a rotary cutter provided with an adjusting device, so that each mortise can have its beveled edges formed of exactly the same depth as rapidly as the hub can be turned upon its support, as will be more fully described by reference to the accompanying drawings, in which—

Figure 1 is a view of my apparatus. Fig. 2 is a longitudinal section. Fig. 3 is an enlarged view of the cutter-head.

In the present case I have shown my apparatus fitted to be secured to the post or support upon which the mortising-chisels work, and it is thus rendered possible to simply move the hub and its supporting apparatus along beneath my apparatus after the mortises are cut.

A is a plate, which is slotted at B, so that it may be secured by a bolt to the upright post, and adjusted up or down to suit the size of the hub to be operated upon. Lugs C C are formed upon each side of the bottom of this plate, and the end of the plate D is pivoted or hinged between these lugs, so that this plate may be turned up or lowered down, as may be desired, the spring P acting to draw it up. This plate D is of considerable length, and has a projecting arm or handle, E, by which it is easily operated. A shaft, F, extends across the plate D at a suitable point, and is rotated by a belt passing around a pulley, G, and extending back or upward to a driving-pulley. A tightener regulates the tension of the belt.

The shaft F has the cutter-head H secured upon it so as to be rotated with it. The cutters I are secured to this head, and may be adjusted by screws J, so as to cut more or less, as desired. The ends of the cutter-head H have saws K, also adjustable, and these saws cut the ends of the bevels, while the cutters I form the bevels themselves.

In order to fit the cutters to any length of mortise which may be made in different-sized hubs, I have formed the head in two parts, divided vertically and transversely to the shaft. Each of these halves is secured to the shaft by a set-screw, L, and this or an equivalent fastening allows them to be separated or brought together, as may be desired.

One of the cutters I is secured to each of the halves of the head, and as they overlap, or pass the plane of division of the head, it will be seen that the two parts of the head may be considerably separated and still make a clean cut. This allows the device to be adjusted to suit the length of the mortise. The depth of the cut is regulated by the spring-plate M, which has one end secured to the plate or frame D, while the other extends below the cutter-head and at one side of it.

A screw, N, passing through the frame is employed to raise or depress the spring, and thus adjust it so that it will rest upon the hub and regulate the depth to which the cutters will enter.

A plate, O, in front of the cutters serves as a guard for the operator. By the use of this device it will be seen that the bevels at the sides of the mortises can be quickly and accurately cut.

Having thus described my invention, what I claim as new, and desire to secure by Letters Patent, is—

1. The plate A, slotted at B to receive the holding and adjusting bolt, and having the plate D hinged to it, as shown, in combination with the cutter-head H and knives I, whereby the bevels upon the edges of the mortises are formed, substantially as herein described.

2. In combination with the vertically-moving plate D, the rotating shaft F, with its cutter-head H and the cutters I K, as shown, said head being divided transversely to the shaft and provided with set-screws L, or equivalent devices, whereby the cut may be lengthened or shortened, substantially as herein described.

3. The vertically-moving plate D, with its rotating cutters I I mounted upon the head H, as shown, in combination with the bar M and set-screw N, whereby the depth of the cut is regulated, substantially as herein described.

In witness whereof I have hereunto set my hand.

PLUMMER HILMAN PARSONS.

Witnesses:
D. E. ALEXANDER,
WM. F. GRIGGS.